United States Patent [19]

Huntley

[11] Patent Number: 4,802,211
[45] Date of Patent: * Jan. 31, 1989

[54] PORTABLE CORDLESS PHONE HOLDER

[76] Inventor: James B. Huntley, P.O. Box 55287, Washington, D.C. 20077-4195

[*] Notice: The portion of the term of this patent subsequent to Nov. 12, 2002 has been disclaimed.

[21] Appl. No.: 882,376

[22] Filed: Jul. 7, 1986

[51] Int. Cl.$^4$ .......................... H04R 1/04; H04R 1/05
[52] U.S. Cl. .................................. 379/454; 379/430; 379/449; 379/455
[58] Field of Search .................. 181/147, 157, 146 R; 379/454, 430, 441, 449, 450, 455

[56] References Cited

U.S. PATENT DOCUMENTS

| | | | |
|---|---|---|---|
| 1,304,718 | 5/1919 | Townsend | 381/187 |
| 2,804,510 | 8/1957 | Sanford | 379/449 |
| 2,822,433 | 2/1958 | Sanford | 379/449 |
| 3,325,604 | 6/1967 | Haus | 379/449 |
| 4,241,242 | 12/1980 | Yeh et al. | 379/449 |
| 4,485,276 | 11/1984 | Sato | 381/183 |
| 4,552,995 | 11/1985 | Huntley | 379/449 |

Primary Examiner—Jin F. Ng
Assistant Examiner—Danita R. Byrd

[57] ABSTRACT

A portable, self contained, lightweight cordless phone holder is provided for the user to permit the free use of both hands and have virtual freedom of movement within the range of the unit while at the same time having ready access and use of the cordless phone. The mechanism is a device made of lightweight malleable metal which permits it to be bent or adjusted to rest on the shoulders of the principle user just below the juncture of the neck and shoulders. The malleable metal permits the principle user to adjust the device for his individual body contours for the most comfortable position while being used. It is basically of a rectangular plan shape comprised of two L-shaped components, an obliquely vertical phone support or cradle extended from one end of the one of the L-shaped members and adjusting straps under the arms so that they hold the mechanism in place while the holder is being used. This mechanism provides for the freeing of both hands while the cordless phone or other type devices are being used.

1 Claim, 2 Drawing Sheets

PORTABLE CORDLESS PHONE HOLDER

This invention relates to a completely self contained cordless phone holder. More particularly, it relates to a cordless phone holder for use in the home, offices, motels, hotels, apartment buildings, etc. or any environment away from the main phone station but within the range of the main station where social interaction takes place whether social or economic in nature.

Other objects and advantages of the invention will be evident or pointed out in detai hereinafter, in connection with the accompanying drawings, wherein there is shown by way of illustration and not of limitation, a preferred embodiment of the invention.

While the invention is susceptible of various modifications and alternative construction, it is shown in the drawings and will be hereinafter described in a preferred embodiment. It is not intended, however, that the invention is to be limited to the specific nor by the specific construction shown herein. On the contrary, it is intended to cover all modifications and all alternative constructions falling within the scope of the invention as defined in the appended claim.

As will be evident from the detailed description which follows, the cordless phone holder is characterized by its simplicity of construction and ease of operation.

Figure 1:
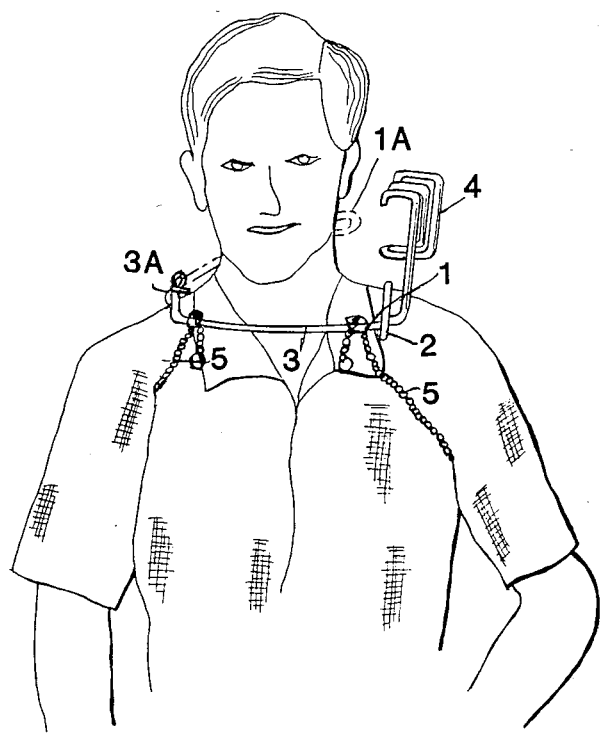
FIG. 1 is a front view of the phone holder positioned on the user.
Figure 2:
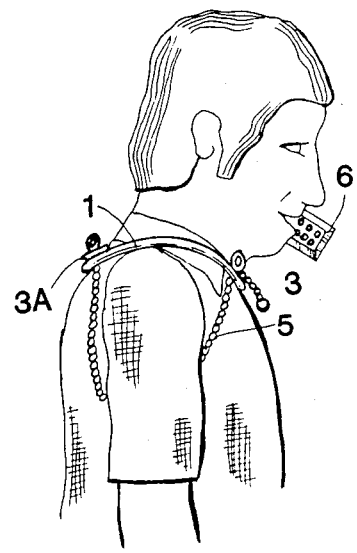
FIG. 2 is a right side view of the cordless phone holder showing how it fits over the right shoulder and connection of the adjusting shoulder strap under the right arm.
Figure 3:
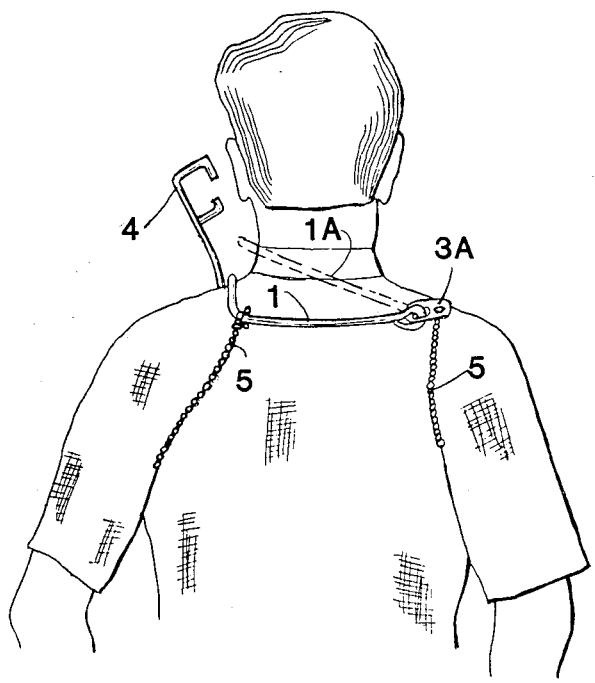
FIG. 3 is a rear view of the user showing the connnection of the main two "L" shaped metal components and their connection which permits the rotation of the "across the back and over the left shoulder" portion by raising and lowering it to permit placing and removing of the device from the shoulders and lowering it for use and nonuse, respectively.
Figure 4:
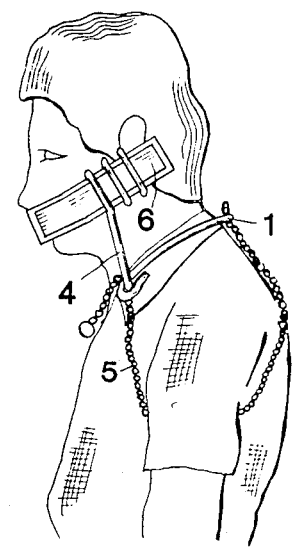
FIG. 4 is a right side view of the device on the user showing a phone in position on the phone holder and the hooked other end of the "L" shaped component in place for the operating mode.
Figure 5:
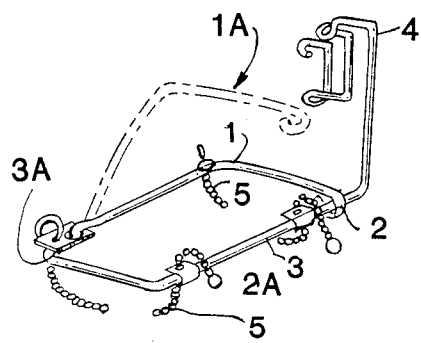

FIG. 5 is a general isometric view of the entire mechanism.

Referring now more in detail to the drawings of the device, the device of the present invention comprises essentially a basically, rectangularly shaped device for resting on the shoulders of the user and substantially made of two "L" shaped wire metal components 1 and 3 with a hinged connection 3A and an obliquely vertical cordless phone holder 4 or cradle attached to and extended from the long leg of 3. Adjusting straps are also connected to hinged connection 3A to permit the user to pass the straps under the armpits from the rear and passing in an upward manner toward the front, up and over 3 at the juncture of the legs of 3, to the left of 2 so that it may be drawn downward through a plate with a hole in it for adjusting to the various size persons and thus stabilizing the entire mechanism for effective operation.

To initially operate the device, the user raises 1 on its hinge at 3A to the position 1A and places the device over his shoulders and then lowers the device over his shoulder and then lowers 1A back to the 1 postion and threads it through the hole on the curved plate and the upright 4 for the portable phone holder, while at the same time having placed his right arm through the adjusting strap 5. With his left hand he inserts the adjusting strap through the slotted hole thus taking up the slack or vice versa thereby adjusting for smaller or larger persons. This process stabilizes the device for immediate use. At this time, the portable phone is then placed in the portable phone holder 4 by placing the phone under the hooks at the top of 4 and twisted slightly in position for continuous operation. The reverse operation is done to take off the device after usage.

What is claimed is:

1. An apparatus for supporting a telephone handset comprising first and second members and an adjustable strap means;

the first member comprising first and second legs forming a substantially L-shaped section wherein the first leg is short relative to the second leg, the second longer leg is adapted to be positioned across the chest of the user and the first shorter leg extends from one end of the second leg over one of the user's shoulder toward the rear of the user, the first member further includes a substantially vertical section extending from the other end of the second longer leg and upwardly from the user's shoulder, wherein the substantially vertical section comprises a bracket means for removably attaching the telephone handset;

the second member comprising third and fourth legs forming a substantially L-shaped section wherein the third leg is shorter relative to the fourth leg, the fourth longer leg is pivotally attached to the other end of the first short leg when the third short leg is not connected to the other end of second longer leg adjacent the vertical section wherein the four legs, when connected, form a substantially rectangular configuration having two rear corners and two front corners;

the adjustable strap means comprising two adjustable straps wherein each strap extends from adjacent one rear corner under one of the user's armpits to a point adjacent one front corner of the rectangular configuration; whereby fastening and adjusting of the strap means under the arms provides for comfort and stability.

* * * * *